Sept. 10, 1968 A. H. BOBECK 3,401,382

MAGNETIC WAFFLE IRON MEMORY STRUCTURE

Filed Sept. 1, 1964

INVENTOR
A. H. BOBECK
Herbert M. Shapiro
ATTORNEY 3,401,382
Patented Sept. 10, 1968

3,401,382

MAGNETIC WAFFLE IRON MEMORY STRUCTURE

Andrew H. Bobeck, Chatham, N.J., assignor to Bell Telephone Laboratories, Incorporated, New York, N.Y., a corporation of New York Filed Sept. 1, 1964, Ser. No. 393,546
7 Claims. (Cl. 340—174)

Figure 1:
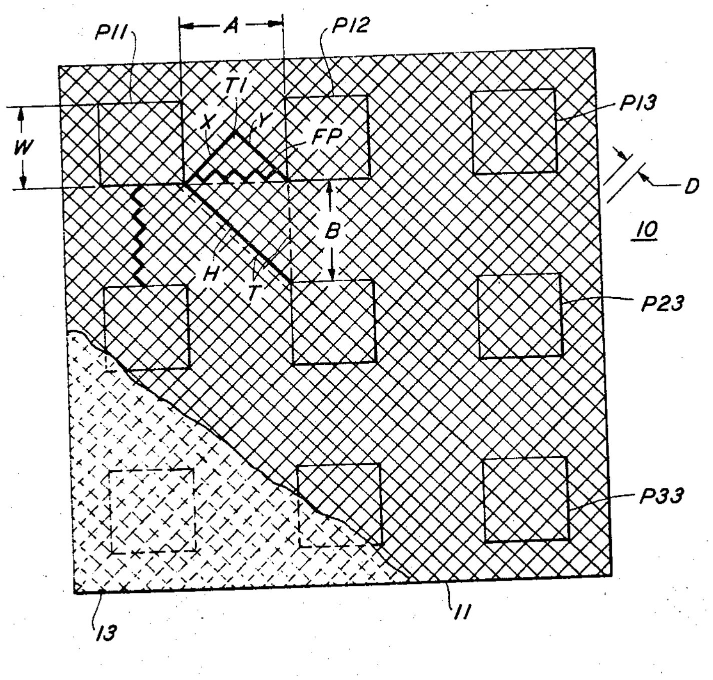

This invention relates to magnetic memories and, more particularly, to magnetic memories of a type including a relatively low reluctance base plate having posts thereon and an overlay of substantially rectangular hysteresis characteristics juxtaposed with the posts.

Memories having the above general magnetic structure are commonly termed "waffle iron" memories and are disclosed in copending application Ser. No. 215,318, filed Aug. 7, 1962, and now U.S. Patent No. 3,274,571, for A. H. Bobeck and J. L. Smith, which application may be considered incorporated herein by reference.

One particular well known mode (see Proceedings of the Intermag Conference, 1963, page 3–2–1) of operating a waffle iron memory, described originally in the aforementioned application, requires flux switching through the overlay along both diagonals between corresponding post pairs in adjacent rows and columns. Such switching is in response to half-select pulses applied coincidently to drive conductors oriented along the rows and columns of posts in the memory. A memory operating in this manner is commonly known as the "cubic" waffle iron memory.

In the cubic arrangement, flux may also partially switch in the overlay between adjacent posts in a row or in a column in response to a half-select pulse. For a drive pulse of any given amplitude, the amount of flux switched is inversely related to the distance traversed by the flux between the posts. Conversely, for any given distance between adjacent posts (that is, the flux path therebetween), the amount of partial switching is directly related to the drive pulse amplitude. This latter flux switching is not used for information storage in this particular arrangement and is peferably avoided. Thus, an upper limit is established to the amplitude of a drive pulse employed with such a memory; the limits to the drive pulse amplitudes are referred to generally as margins of operation. In addition, this unused flux switching is accompanied by an inductance which produces a back EMF loading the drive conductors and reducing the operating speed of the memory.

The unused switching may be reduced by spacing apart the posts distances greater than a minimum distance sufficient to permit the drive conductors to be threaded therethrough. A solution is not to be found merely by spacing the posts further apart, however, because the diagonal distance between posts also is increased thereby. As a consequence, not only is the maximum amplitude for the half-select pulse increased, but also the required minimum amplitude for a full-select pulse is increased as well. Thus, the operating margin (the spread between the required amplitudes) is not increased and the power consumed is increased.

Further, as stated in the aforenoted article in the Proceedings of the Intermag Conference, the overlay material must have essentially isotropic magnetic properties. This requirement limits the choice of overlay materials because most otherwise suitable materials are anisotropic.

Accordingly, an object of this invention is to provide a new and novel waffle iron structure exhibiting improved operating margins by virtue of the fact that the flux path through the overlay between adjacent posts in a row or column of posts in the structure is made relatively long with respect to the flux path through the overlay between similarly spaced posts in the rows and columns of a prior art structure, and the flux path in the overlay between diagonally positioned posts is maintained substantially the same as it is in the prior art structure.

It is a further object of this invention to provide a new and novel waffle iron structure wherein the overlay is fabricated from anisotropic material.

The above and further objects of this invention are realized in one embodiment thereof wherein a waffle iron structure includes an overlay comprising a magnetic film in a screen-like pattern of interconnected magnetic filaments or tapes wherein similarly oriented tapes are spaced apart distances small compared to the width of a post of the structure. The overlay, when the tapes are oriented along diagonals with respect to the rows and columns of waffle iron posts, provide therealong straight flux paths relatively short with respect to the paths provided between adjacent posts in the structure.

Thus a feature of this invention is a waffle iron structure including an overlay comprising a magnetic film in the form of a screen-like arrangement of magnetic tapes wherein similarly oriented tapes are spaced apart distances small compared to the width of a post of the structure.

Figure 2:
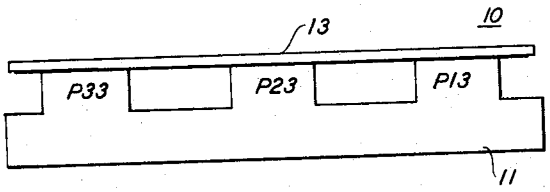

The foregoing and other objects and features of this invention will be understood more fully from the following discussion rendered in conjunction with the accompanying drawing, wherein:

FIG. 1 is a top view, partially cut away, of a waffle iron structure in accordance with this invention; and FIG. 2 is a side view of the structure of FIG. 1.

FIG. 1 shows a waffle iron structure 10 comprising a low reluctance base plate 11, including posts P thereon. The posts P are arranged in rows and columns, and each post designation includes numerals corresponding, respectively, to the row and column in which the post is positioned. Each post has a prescribed width designated W in FIG. 1. An overlay 13, typically of a material having substantially rectangular hysteresis characteristics, is in contact with all the posts. The relation between the overlay and the posts is shown clearly in FIG. 2.

The overlay 13 has a screen-like appearance and may be thought of as comprising first and second sets of interconnected tapes of magnetically retentive material arranged, illustratively, orthogonally with respect to each other. Most importantly, the tapes of each set are spaced apart from one another distances D small with respect to the width of a post of the structure. The spacing is to avoid the necessity of registering the tapes with the posts and also to provide an overlay which appears as a continuous film to flux switched therethrough.

In FIG. 1, the overlay is shown oriented so that the uninterrupted filaments or tapes, a representative one of which is designated H, interconnect, for example, post P11 and P22 positioned diagonally with respect to each other. This tape is designated H because it is, in each instance, the hypotenuse of a right triangle with respect to which the advantages of this invention may be expressed simply in mathematical terms. Specifically, if we designate the distance between adjacent posts in a row as A, and the distance between adjacent posts in a column as B, then a right triangle, having sides A and B and a hypotenuse H, may be designated by a broken line T as shown in FIG. 1.

From inspection of the figure, one might expect that flux switching between adjacent posts would occur more easily than between posts positioned diagonally with respect to each other because the physical distances between adjacent posts is less than between those along a diagonal.

Quite to the contrary, in accordance with this invention, the path for the flux switched along diagonals may remain the same as in the prior art overlays, but the path between adjacent posts is tortuous, as shown in FIG. 1 by the line designated FP for flux path. By projecting the segments of the line FP onto lines X and Y, shown in FIG. 1, the flux path can be seen to be equal in length to line X plus line Y. In this connection, lines X and Y each coincide with a representative tape, from each set of orthogonally disposed tapes, in contact with one of the adjacent posts P11 and P12. If lines X and Y are considered as the sides of a right triangle T1, it is clear that the flux path FP (equal to $X+Y$) is longer than line A. More specifically, from the Pythagorean theorem $$A=\sqrt{X^2+Y^2}$$

From right triangle T, however, $H=\sqrt{A^2+B^2}$. If we assume that $X=Y$, and $A=B$, then $A=X\sqrt{2}$ and $$H=A\sqrt{2}=2X=X+Y=FP$$

Thus the flux path between adjacent posts is, in accordance with this invention, substantially the same length as the path between diagonals when all the posts are spaced apart equal distances.

In one specific embodiment, waffle iron posts were 10 mils (.010 inch) on a side spaced apart 5 mils. The overlay, comprising 81 nickel-19 iron (by weight) permalloy, was formed by evaporating through a parallel wire mask one mil tapes 1000 Angstrom units thick and two mils apart. This evaporation was carried out in a magnetic field of 100 oersteds oriented along the axis of the tapes. The mask was rotated ninety degrees and the evaporation was repeated in the presence of a similar magnetic field oriented along the new axis of the tapes. The tapes were deposited on a suitable nonmagnetic substrate. The overlay then was clamped in contact with the posts in the well known manner, the tapes being oriented along the diagonals.

The amount of flux switched through a waffle iron post, as is well known, is a function of the width W of the post. The number of magnetic tapes contacting each post is accordingly chosen, depending on the fluxcarrying capacity of each tape, to correspond to the amount of flux switched through the posts. That is to say, the fluxcarrying capacity of the tapes contacting a post is chosen less than that of the posts contacted by the tapes. This choice is made to avoid switching, in the tapes, more flux than can be accommodated by the post.

It is clear from the foregoing discussion that the magnetic tapes need not be spaced equal distances apart nor that they be present except between posts between which flux is switched. Moreover, the tapes need not be of like sizes (that is, cross-sectional areas). Equal spacings, like sizes, and uniform distribution of magnetic tapes, however, are conveniently and inexpensively achieved by well known techniques, and problems of registration between tapes and posts are avoided thereby.

It is to be understood, further, that the posts need not have equal side dimensions in accordance with this invention, nor need they be spaced apart equally. Similarly, the sets of tapes of the overlay need not be disposed orthogonally with respect to each other. For example, adjacent posts in a row may be spaced relatively close together and the posts in a column spaced relatively far apart. Conversely, the posts in the columns may be more closely spaced apart than those in the rows. In these instances, however, the sets of tapes composing the overlay are not deposited orthogonally with respect to one another but rather at some obtuse or acute angle, respectively, to permit the alignment of the tapes along the diagonals. The tortuous flux path followed by flux switched between adjacent posts under these circumstances, of course, will not be equal in length to the diagonals. It is clear, however, that the path between adjacent posts always will be longer in accordance with this invention than it would be if prior art continuous film overlays were employed.

Accordingly, the objects of an arrangement in accordance with this invention are realized. Specifically, the cubic waffle iron memory has limits on the half-select pulses which are increased relative to those of the full-select pulses, and tapes of anisotropic material are utilized.

It is characteristic of a structure in accordance with this invention that flux is switched through a plurality of tapes in the overlay. An advantage attributable to this characteristic is the inherent averaging of any variations between the magnetic characteristics of the tapes through which flux is switched. Accordingly, an overlay in accordance with this invention exhibits unusually homogeneous magnetic characteristics.

The various conductors and drive pulse sources required to establish diagonal flux switching in a consistent manner for storing information in a cubic waffle iron memory are well known. A description of such circuitry is not necessary to an understanding of this invention and is, accordingly, omitted herein. Any such circuitry which provides flux switching along diagonals between the posts of a waffle iron structure as described in accordance with this invention may be used. Suitable circuitry is described in the aforementioned application and publication.

It is to be understood that the specific embodiments of this invention described herein are merely illustrative and that numerous other arrangements according to the principles of the invention may be devised by one skilled in the art without departing from the spirit and scope of this invention.

What is claimed is:

1. In combination, a relatively low reluctance magnetic base plate having a plurality of posts thereon, said posts having a prescribed width, and an overlay juxtaposed with said posts, said overlay comprising intersecting first and second sets of magnetically retentive tapes, the tapes of each of said first and second sets being spaced apart distances small compared with said prescribed width, the tapes of said first set being in contact with the tapes of said second set at the intersections therebetween.

2. A combination in accordance with claim 1 wherein the magnetic tapes of each of said first and second sets are spaced apart equal distances.

3. A combination in accordance with claim 2 wherein the posts are arranged in rows and columns and the tapes are positioned along diagonals with respect thereto.

4. A combination in accordance with claim 3 wherein adjacent posts are spaced apart equal distances.

5. A combination in accordance with claim 4 wherein said first and second sets of tapes are positioned orthogonal with respect to each other.

6. A combination in accordance with claim 5 wherein said tapes are of anisotropic permalloy.

7. A combination in accordance with claim 5 wherein the distance between adjacent posts is effectively the same as the distance between posts along a diagonal.

No references cited.

BERNARD KONICK, *Primary Examiner.*

J. W. MOFFITT, *Assistant Examiner.*